March 24, 1953 — A. N. SPITZ — 2,632,359
PLANETARIUM

Filed May 3, 1948 — 6 Sheets-Sheet 1

INVENTOR.
ARMAND N. SPITZ
BY
*Busser & Harding*
ATTORNEYS

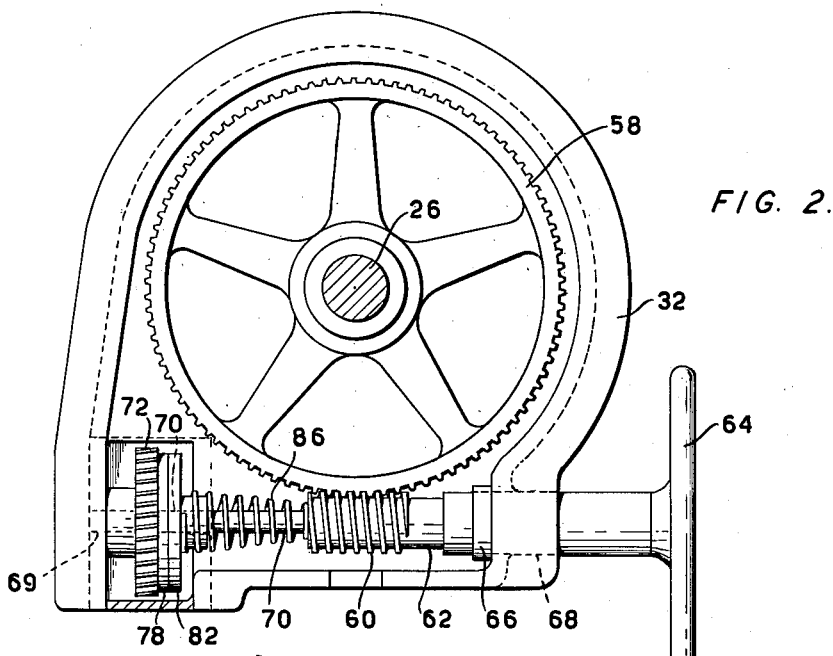
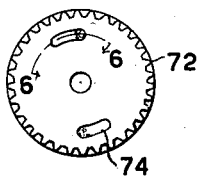
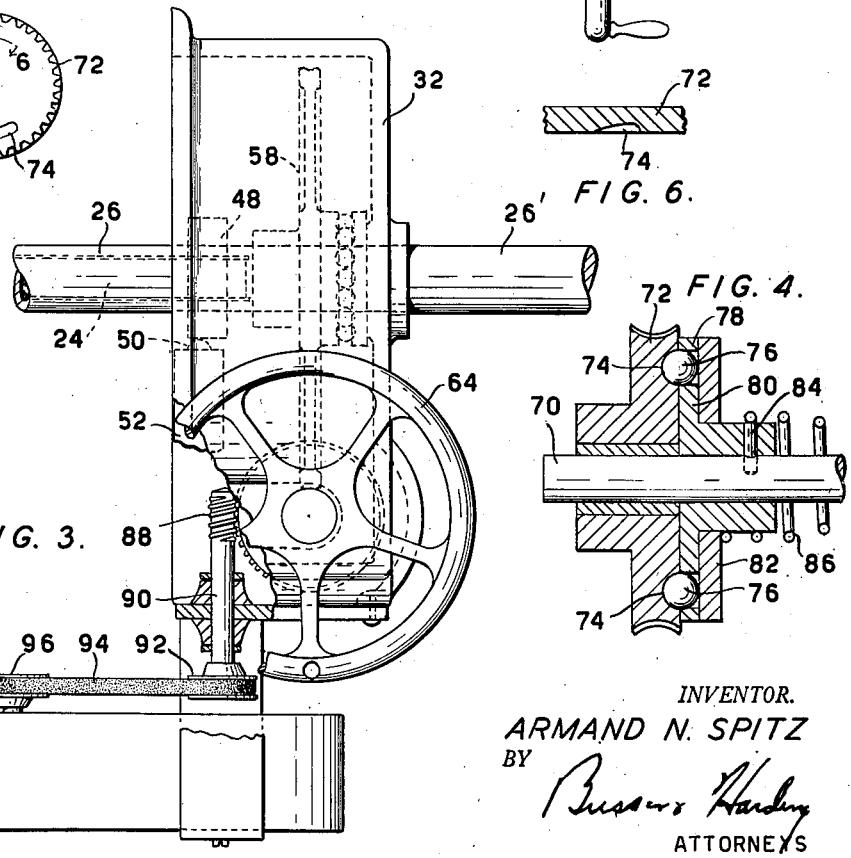
INVENTOR.
ARMAND N. SPITZ

March 24, 1953 — A. N. SPITZ — 2,632,359
PLANETARIUM
Filed May 3, 1948 — 6 Sheets-Sheet 3

INVENTOR.
ARMAND N. SPITZ
BY
ATTORNEYS

March 24, 1953  A. N. SPITZ  2,632,359
PLANETARIUM
Filed May 3, 1948  6 Sheets-Sheet 4
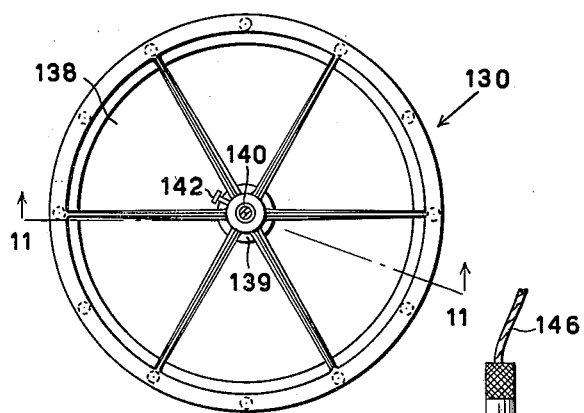
FIG. 9.
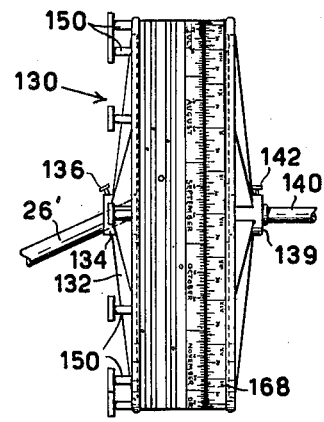
FIG. 10.
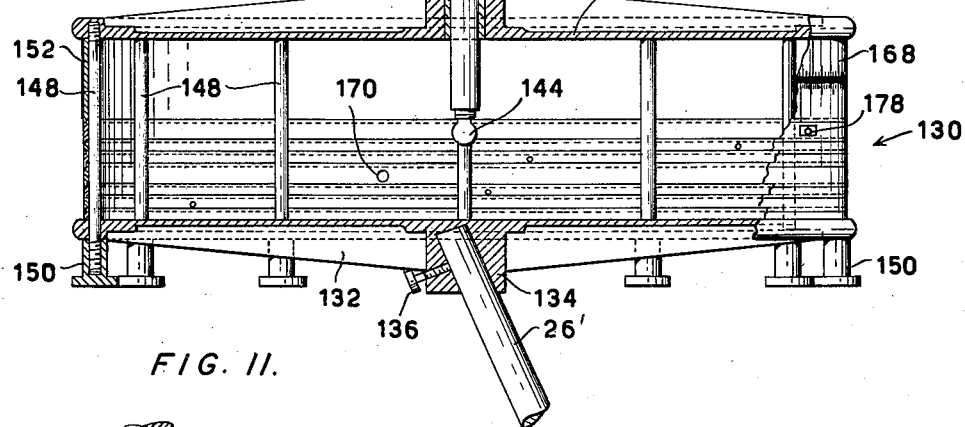
FIG. 11.
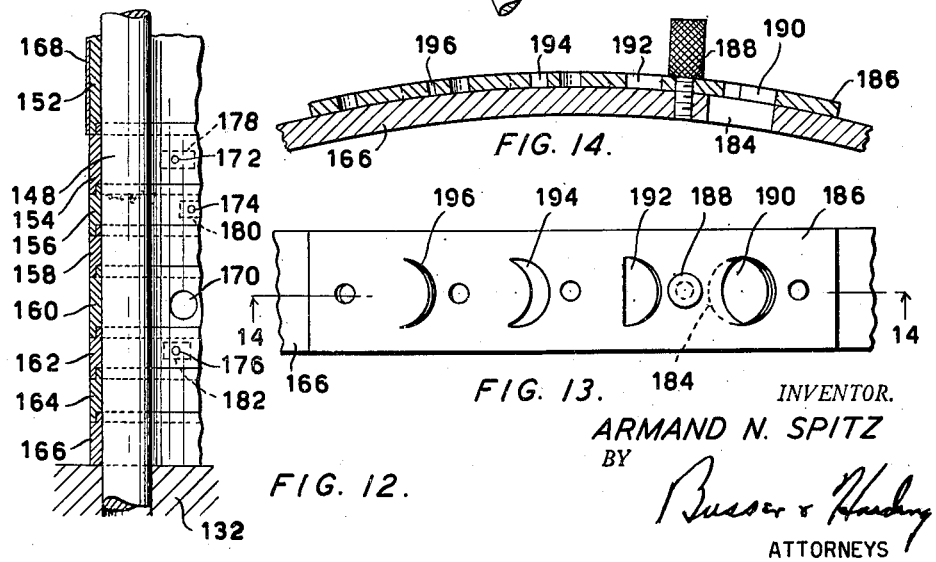
FIG. 12.
FIG. 14.
FIG. 13.
INVENTOR.
ARMAND N. SPITZ
BY
Busser & Harding
ATTORNEYS

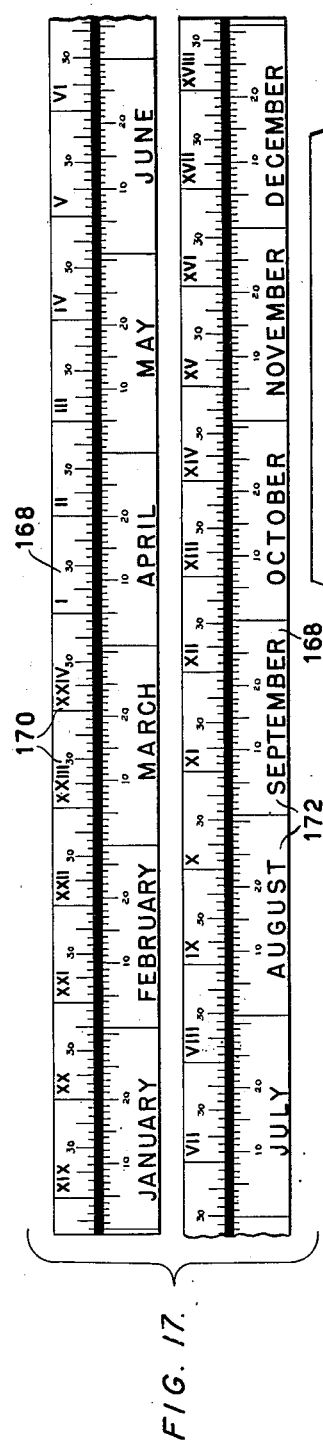
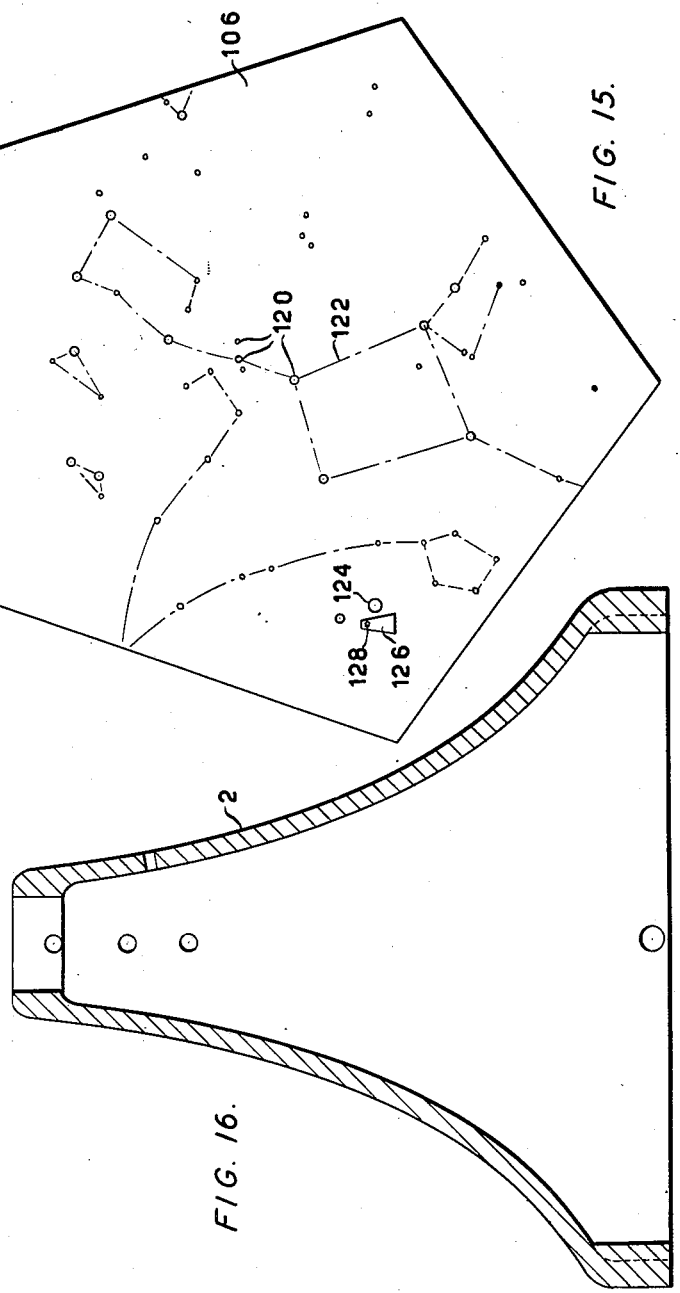

March 24, 1953　　A. N. SPITZ　　2,632,359
PLANETARIUM

Filed May 3, 1948　　6 Sheets-Sheet 6

INVENTOR.
ARMAND N. SPITZ
BY
ATTORNEYS

Patented Mar. 24, 1953

2,632,359

UNITED STATES PATENT OFFICE 2,632,359

PLANETARIUM

Armand N. Spitz, Lansdowne, Pa.

Application May 3, 1948, Serial No. 24,718

12 Claims. (Cl. 88—24)

This invention relates to a planetarium and particularly to one of small size and inexpensive construction but, nevertheless, suitable for use in astronomical instruction or demonstration.

The large and elaborate planetaria located in various parts of the world are, of course, capable of demonstrating the relationships and motions of the heavenly bodies to a high degree of accuracy and detail. However, they are correspondingly extremely expensive in view of the elaborate optical systems used and the intricate devices involved which will duplicate to a high accuracy of realism the locations and motions of the stars, planets and other bodies.

It is a general object of the present invention to provide a planetarium of quite simple and inexpensive construction which is particularly adapted for use in teaching astronomy and navigation in small schools, museums and other institutions or even for home use where a large outlay of money is out of the question. In accordance with the invention, these ends are achieved with very little loss of realism as contrasted with the expensive planetaria above mentioned. For example, these expensive planetaria project on domes images of the stars which are true circles and which are true in their brightness relationships. However, for realism the dome is darkened so as to simulate the night sky and the images of the stars are dimmed to such degree as to simulate their visual intensities when viewed in the darkness. Actually, under these conditions, the human eye is very little appreciative of the high accuracies of reproduction of the stars by these large planetaria. Under low intensities of illumination, the eye cannot discern to any substantial degree whether a particular projected spot of light is truly circular or not. Furthermore, of two spots having equal intensities over equal areas, that spot which presents the larger area will appear brighter. In accordance with the present invention, projection of the stars and planets is provided merely in the form of the projection through pinholes of various sizes of the images of concentrated filament lamps. When closely examined, such images are, of course, images of the lamp filaments blurred to a greater or less extent depending upon the sizes of the pinhole openings and the sizes of the lamp filaments. Nevertheless, in a room darkened to the proper extent to simulate night-time conditions, these images, when viewed from distances of the order of upwards of about five feet, simulate the appearance of stars to the average eye to such extent as to make this mode of projection highly acceptable.

One of the subsidiary objects of the invention is, accordingly, the achievement of these satisfactory results by the use of a simple projection system of the type just indicated.

It may be here noted that the projection effected by the present planetarium may be upon the inside of a spherical or approximately spherical dome; but quite acceptable results are secured by projection on the flat ceiling and walls of a conventional room or hall.

In achieving simple and inexpensive construction, there is a further highly important feature of the invention. The use of a projection system such as just described would indicate the desirability of using a sphere of opaque material, at the center of which a lamp would be mounted, with radially extending pinholes through the surface of the sphere. If a large number of stars are to be projected in their proper relationships, it would be necessary to drill or otherwise form in such a sphere a correspondingly large number of pinholes. To do this on a spherical surface is a quite difficult operation. In accordance with the present invention, there is used, instead of a sphere, a globe in the form of a polyhedron having plane faces. If such faces are drilled in flat form, there will, of course, be approximately radial conditions of the holes only in the vicinity of the centers of the plane faces, the peripheral holes being directed non-radially when the polyhedron is assembled. It has been found that, with a proper choice of polyhedron, the effect of this condition is negligible in destroying the simulation of stars by the images projected through the holes. Of the possible polyhedra, the regular dodecahedron and the regular icosahedron have been found most suitable with the former offering some advantages despite the smaller number of sides. The reason for this may be ascribed to the fact that the angles between radii and normals to the pentagonal sides of the dodecahedron are smaller at the vertices of the sides than in the case of the icosahedron, so that the axes of the holes actually deviate less from radii at the vertices of the faces of the dodecahedron than they do at the vertices of the faces of the icosahedron. There may, of course, be used various other non-regular polyhedra, but a survey of the possibilities indicates the rather considerable advantages of the regular dodecahedron in that it represents the best compromise between a minimum number of sides and least deviation of the axes of peripheral holes from the radii. Rather obviously, of course, a truncated dodecahedron would be superior to the regular dodecahedron but the very substantial increase in number of sides makes considerably more difficult the lay-out and drilling of pinholes without sufficient advantages to justify the difficulties.

Another object of the invention is to provide a simple projector for the planets, the sun and the moon, and, in the case of the moon, to provide a suitable demonstration of its phases. From a theoretical standpoint, the last mentioned projector may not, when it is of reasonable size, show the planets and the sun and moon in sufficient proximity to the plane of the ecliptic. However, here again the memory of the observer is not sufficiently accurate to render obvious any substantial deviation from reality. From a qualitative standpoint, the effects produced are thoroughly satisfactory, and, in fact, even a quantitative result is almost secured.

In this last named projector, provision is made for the simple relative shifting of the bodies and there is provided an index ring graduated in hours of right ascension and also in calendar days so that from astronomical tables the positions of the bodies may be quite accurately located for any particular time.

The phases of the moon may also be demonstrated quite realistically even though not continuously through the use of a simple masking arrangement.

In the case of both stars and planets, the invention also provides for the indication of these bodies in their proper color relationships, this end being achieved simply by the use of transparent color filters covering the pinholes through which the projection is effected.

A further object of the invention is the provision of a motor drive, by means of which continuous proper motions of the star, planet and other images may be secured. This drive also involves the possibility of hand operation without interference with the motor drive so that the demonstrator may, at any time, shift the images forwardly or backwardly or cause them to stand still temporarily with or without disconnecting the driving motor.

All of the objects heretofore indicated, as well as other objects relating to various details such as the location of the equinoxes and solstices, will become apparent from the following description, read in conjunction with the accompanying drawings, in which:

Figure 2 is an elevation showing certain details of the drive mechanism;

Figure 3 is a side elevation, partly in section, also showing the drive mechanism;

Figure 4 is an axial sectional view showing, in particular, a clutch arrangement permitting hand drive independent of the driving mechanism;

Figure 5 is an elevation showing the face of a worm gear forming part of the clutch mechanism;

Figure 6 is a fragmentary section taken on the arcuate surface indicated at 6—6 in Figure 5;

Figure 9 is a plan view of the planet projector;

Figure 10 is a side elevation thereof;

Figure 11 is a section taken on the broken plane indicated at 11—11 in Figure 9;

Figure 12 is an enlarged fragmentary section showing the left hand portion of Figure 11;

Figure 13 is a fragmentary plan view showing, in particular, the masking means for demonstrating the phases of the moon;

Figure 14 is a section taken on the plane indicated at 14—14 in Figure 13;

Figure 15 is a view showing a typical face of the dodecahedron having pinholes therein;

Figure 16 is a vertical section illustrating the construction of the base of the instrument;

Figure 17 shows in two parts a development of the scale indicating hours and minutes and months and days and provided for the adjustment of the elements of the planet projector;

Figure 18:
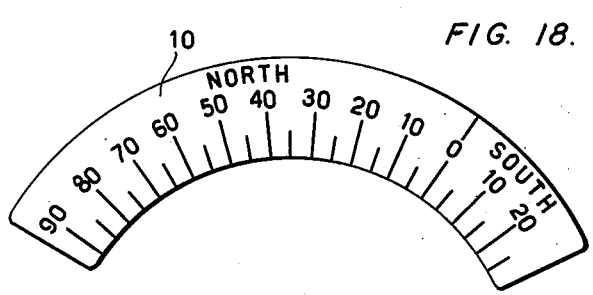
Figure 18 is a plan view showing a scale associated with the adjustment of the mounting for the projectors.

The planetarium comprises a base 2, in which is secured a supporting post 4 carrying the pivot 6 for a saddle 8, there being provided a clamping knob 9 for fixing the saddle in angularly adjustable position which is indicated by a scale 10 (see Figure 18) moving adjacent to a fixed index marker 12. This scale indicates the viewpoint of observation of the heavens; for example, when adjustment is made to bring the north 40 marking to the index, the simulation will be of the skies as viewed at a latitude of 40° north. As indicated by the scale, the apparatus is adapted to show the skies as viewed from the north pole to about 30° south latitude. The saddle 8 is desirably made quite thin so that its action in occulting the star images is negligible; in fact, during operation, unless an observer is carefully following a particular star, the position of the saddle will not be noticeable.

Figures 7, 8:
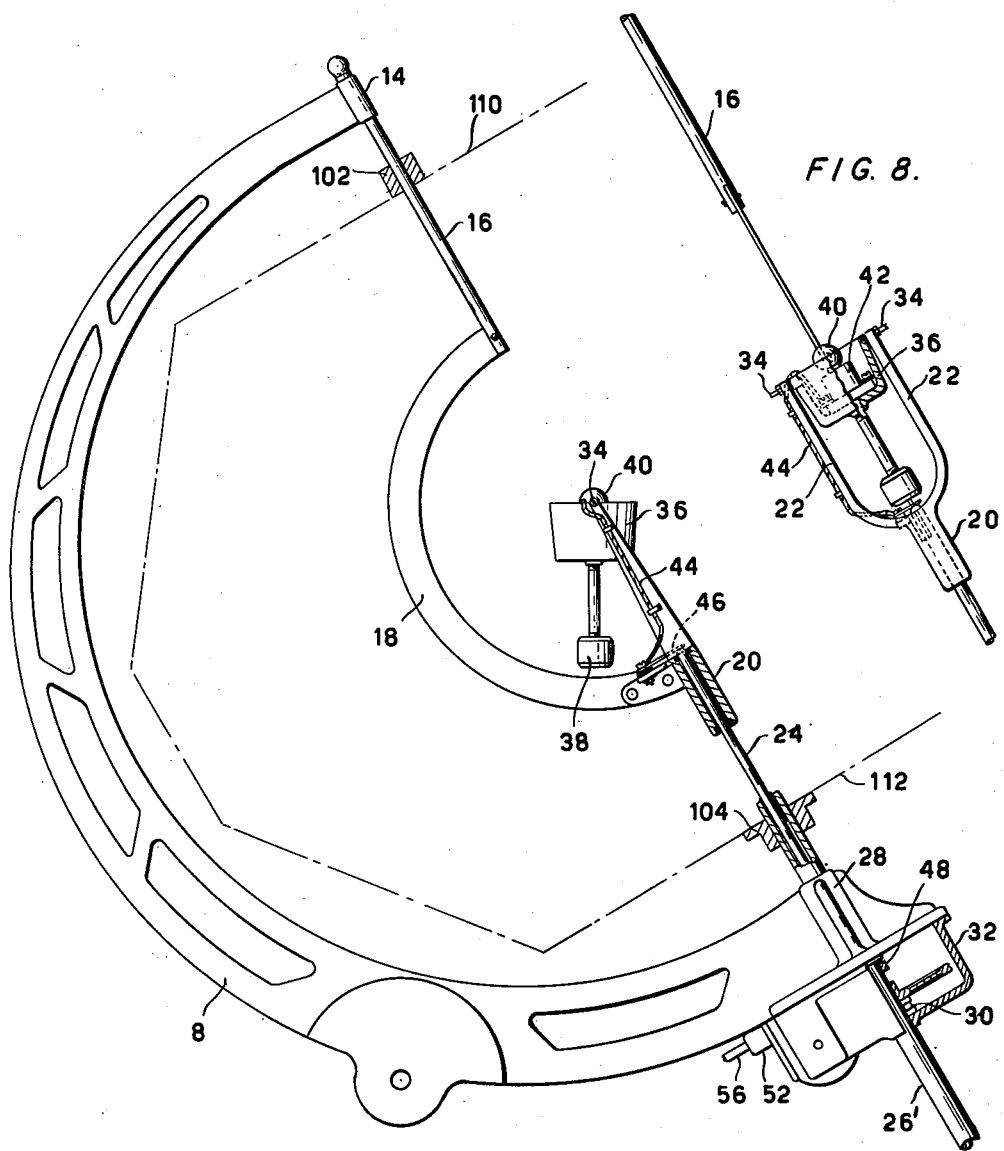
Figure 7 is a fragmentary elevation, partly in section, showing particularly details of the lamp mounting whereby occulting of the illumination is continuously effected at the horizon.
Figure 8 is a view taken at right angles to that of Figure 7 serving also to illustrate the lamp mounting and occulting arrangement.

Referring to Figure 7, there is particularly illustrated therein the lamp mounting. In the upper end 14 of the saddle there is fixed a rod 16 which carries an arcuate member 18, preferably in the plane of the saddle and also flat, which is provided with a bearing member 20 at its lower end. This bearing member is provided with extensions 22 providing a fork. The bearing 20 is provided with insulating rings in which there is mounted a rod 24 with resulting electrical insulation from the bearing member 20. This rod 24 extends within the upper end of a shaft 26 being also insulated therefrom through a suitable insulating sleeve and is electrically connected through an insulated screw 27 to a collector ring 48 also insulated from the shaft 26. The shaft 26 extends through bearings 28 and 30, the latter being carried by a housing 32 secured to the lower end of the saddle and from this housing the shaft extends in the form of an extension 26'.

Trunnions 34 extending from a cup 36 are pivoted in bearings in the fork members 22. The cup is weighted by a weight 38 so that its axis will always remain vertical. Within the cup, a lamp 40 is supported in a socket 42, one terminal of which is grounded to the cup while the other terminal is connected to a flexible insulated wire 44 which, in turn, is connected to a spring wiper 46 engaging the end of the rod 24, this wiper being insulated from its support on the member 20.

The lamp 40 is of a low voltage type having a very concentrated filament to provide a light source of very small surface as viewed from any direction. The filament is desirably substantially in the plane of the upper edge of the cup 36 with the result that the edge of this cup defines the horizon below which projection will not occur. As will be evident, the suspension of the cup will maintain its upper edge in a horizontal plane despite either rotation of the globe or tilting of the saddle, the axis of the trunnions 34 always being horizontal.

Figures 19, 21:
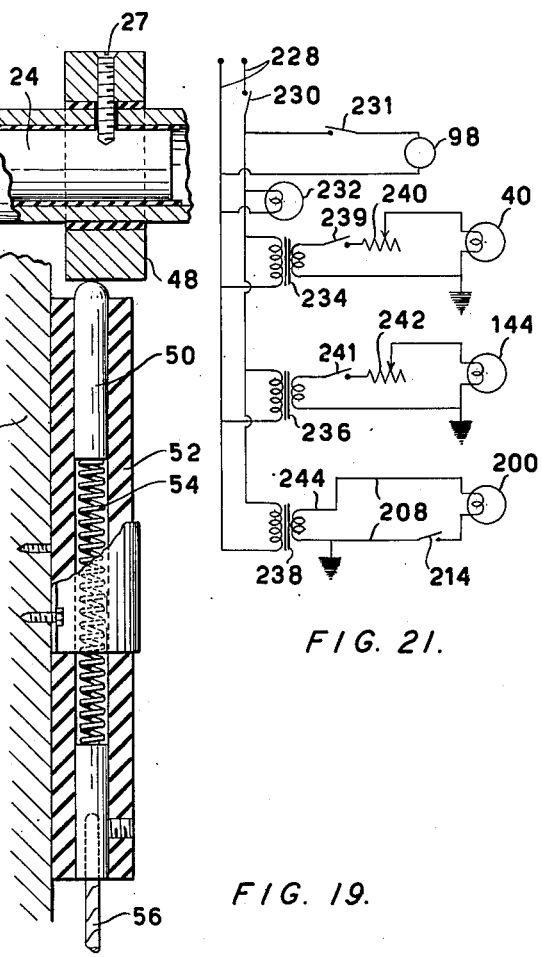
Figure 19 is a detailed sectional view showing a brush arrangement involved in making electrical connections with the star projecting lamp.
Figure 21 is a wiring diagram indicating the electrical wiring of the device.

Reference to Figure 19 will indicate how current is conducted through the lamp filament. The collector ring 48, referred to above, is engaged by a plunger 50 under the action of a spring 54 and current is conducted to the spring and the plunger through a lead 56. All of these elements are housed in an insulating tube 52 clamped to the saddle 8. The path of current is thus from the conductor 56 through the lamp to the frame of the planetarium which constitutes the ground.

To the shaft 26 there is secured a large worm wheel 58 meshing with a worm 60, the shaft 62 of which is provided with a collar 66 and extends through the housing 32 to carry a hand wheel 64 through which manual rotation may be imparted to the shaft 26. As viewed in Figure 2, a left hand extension 70 of the worm shaft has a bearing at 69 in the housing. Journalled on this shaft is a worm wheel 72 which is provided with sockets 74, each of which is formed as indicated in Figures 5 and 6 with one relatively slightly inclined end and with the other end relatively abrupt. These sockets are adapted to engage balls 76 which are carried in holes 78 in a flanged member 80 which is pinned to the shaft 70 at 84. A disc 82 is urged against the flange of the member 80 to confine the balls under the action of a spring 86 which bears against the end of the worm 60. A worm 88 drives the wheel 72, this worm being carried by a shaft 90 which is driven through pulleys 92 and 96 and belt 94 from a motor 98.

The motor rotates in a direction to rotate the shaft 26 and the globe which it carries in the proper direction to give rise to the diurnal motion of the stars. During this motion, the drive is such that the balls 76 are driven by the abrupt ends of the depressions 74. Since the parts driven are light and not subject to any substantial frictional retardation, this drive is effectively positive in character. Even with the motor running, however, manual drive may be effected in either a forward or reverse direction. In either case, the balls 76 will ride out of the depressions 74 with slightly more difficulty in the reverse direction than in the forward direction but in any case due to the yielding action of the disc 82 against the spring 86. A demonstrator may, accordingly, move the globe either forwardly or backwardly at will or by merely holding the wheel 64 stationary may hold the globe stationary even while the motor continues to run. The reduction gearing may effect, through the motor, the drive of the globe at any suitable rate preferably at a rate which will produce slow motion such as will enable observers to follow the stars quite readily.

The globe is indicated as a unit at 100. As indicated in the introduction to this specification, it is desirably in the form of a polyhedron and preferably in the form of a dodecahedron having twelve pentagonal sides. Other polyhedra may be used, but, as previously indicated, the dodecahedron is preferred since it has the optimum properties consistent with ease of manufacture and satisfactory projection results. An icosahedron of twenty sides, each in the form of an equilateral triangle, is also quite satisfactory as are various other polyhedra which need not be regular, i. e., which may have different types of sides or which may have absence of complete symmetry. Many such polyhedra will be found among crystal forms and it is believed that further discussion thereof is not necessary. It may be here remarked that certain aspects of the invention can obviously be applied to the use of spherical globes as well as polyhedral globes; but spherical globes, in general, involve such difficulties of manufacture that they are not to be preferred.

Figure 1:
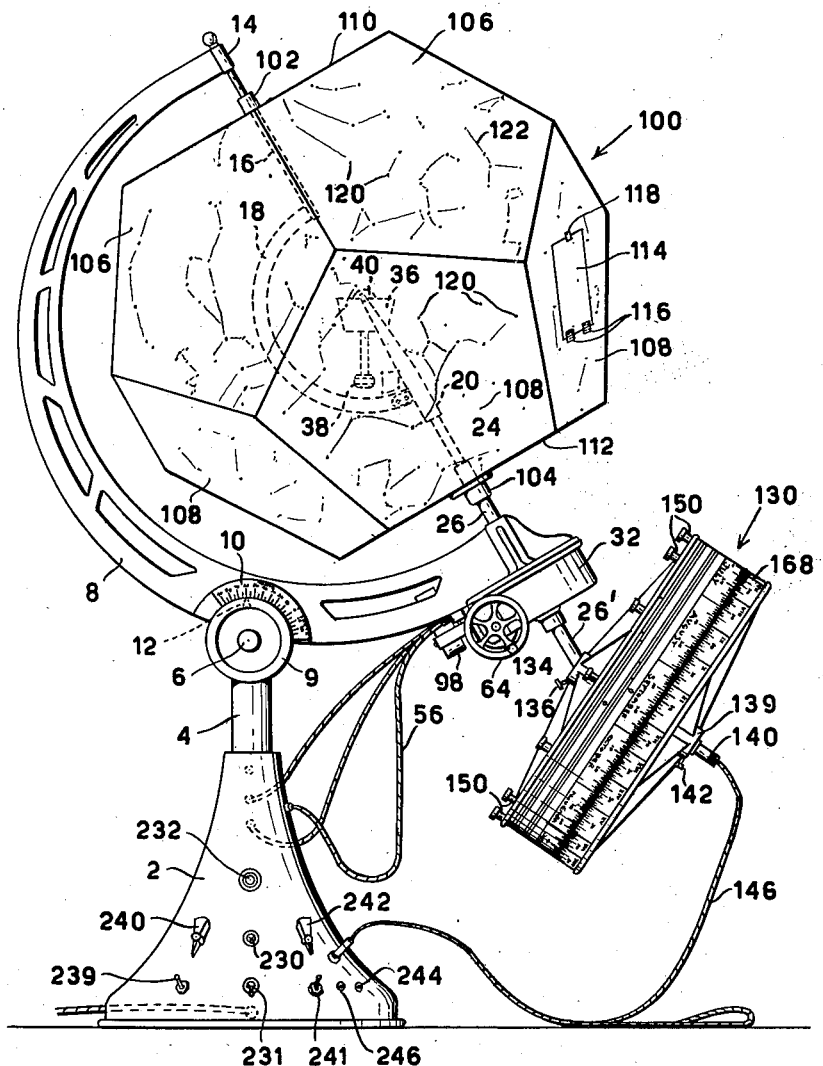
Figure 1 is a side elevation of the complete instrument showing both the star and planet projectors.

The arrangement of the preferred dodecahedral globe is as illustrated in Figure 1 with an upper group of pentagonal sides 106, a lower group of sides 108 and top and bottom pentagonal sides 110 and 112. The mounting axis is through the centers of the last two sides which are provided respectively at 102 with a bearing secured to the face and surrounding the rod 16 and with a member 104 which is clamped to the upper end of the shaft 26. The globe, accordingly, revolves with the shaft 26 about the axis of the shaft which constitutes the polar axis.

The faces of the dodecahedron may be formed of various materials, for example, of sheet metal such as aluminum or of sheets of plastic material. The edges of the faces may be secured to each other in any desired manner, but, when plastic faces are used, as is desirable to give a very light construction, the securing may be most readily effected by cementing, with fabric binding strips cemented to the faces to hold them together. When assembled, the dodecahedron is quite rigid and requires no internal bracing in addition to the securing of the sides to each other. One of the faces is desirably provided with a door 114 hinged at 116 and normally closed by a latch 118 so as to permit access to the bulb for replacement thereof.

The individual pentagonal sides are drilled with pinholes 120 through which the star images are projected. As pointed out above, the relative brightnesses of the various stars can be effectively simulated merely by changing the sizes of the pinholes. A larger pinhole, of course, will produce a projected image which is actually larger in area than that produced from a smaller pinhole. However, in a darkened room, the effect of this to the eye at a reasonable viewing distance is not that of difference of size but rather of difference of brightness. The holes are drilled at right angles to the planes of the sides, and, consequently, after assembly, their axes are not, in general, radial. Nevertheless, this does not affect the results to any appreciable degree when the sides are of thin material and a globe such as a dodecahedron is adopted.

In the cases of stars having well-defined colors, the colors may be simulated merely by adhering on the inside of the globe over the corresponding pinholes strips of transparent colored cellophane. This is done in the fashion which will be more fully indicated in the later description of the planet projector.

If desired, there may be marked on the outer surface of the globe, lines joining the various stars as indicated at 122 to group these in the conventional fashion as constellations. Such markings are of assistance in the study of stars when the globe is viewed in a lighted room, for example, before projection takes place.

Besides the pinholes which indicate the stars, there may be provided additional openings such as indicated in Figure 15 at 124. These openings which are adapted to be closed by flaps 126 pivoted at 128 may serve to identify marking points such as the equinoxes and the solstices and serve not only for demonstration of the location of these points but also for the setting of the planet projector. Normally, of course, these openings should be closed. If desired, they also may be backed with colored cellophane so as to make them readily identifiable.

The planet projector is indicated at 130 and is particularly illustrated in Figures 9 to 14, inclusive. Castings 132 and 138 provide the ends of this projector which is of generally cylindrical form. Casting 132 is provided with a boss 134 in which there is drilled at an angle an opening for the reception of the shaft extension 26' which may be secured in position by a set screw 136. This defines the angle between the axis of the planet projector and the polar axis which is, of course, the angle of 23½° corresponding to the angle between the plane of the ecliptic and the plane of the equator. The projection of the planets, as will shortly be obvious, is, accordingly, in the direction of the plane of the ecliptic.

The casting 138 is provided with a boss 139 provided with a bushing 141 in which is adjustably secured by a set screw 142 a tube 140 carrying a socket for a bulb 144 which is similar in its characteristics to the bulb 40. A lead 146 serves to provide current to one terminal of the bulb, the other terminal of which is grounded.

The two castings 132 and 138 are secured together by a series of threaded rods 148 located at their peripheries and serve to clamp a series of rings between them, the clamping pressure on which may be relieved by freeing of the nuts 150. These rings are indicated at 152, 154, 156, 158, 160, 162, 164 and 166. As indicated in Figure 12, these rings are shaped at their edges so as to interlock, with sliding bearing on each other and on the outer surfaces of the rods 148.

The ring 152 carries on its exterior a scale strip 168 which is illustrated in detail in Figure 17. This is provided with markings 170 indicating hours and minutes of right ascension and with month and day markings 172. The scale serves as a reference for the setting of the planets, the sun and the moon. It may be noted that the hours of right ascension are marked on a scale which is substantially in the plane of the ecliptic rather than an equatorial plane. Since right ascension is properly measured in an equatorial plane, the hourly divisions of the scale 170 will not be of equal angular extent; i. e., the markings on the scale 170 are such as would be provided by the projection into the plane of the ecliptic of equiangular markings on an equatorial circle along meridional great circles passing through the celestial poles. Since these markings are used for the setting of the images of bodies which move substantially in the plane of the ecliptic, this arrangement is quite satisfactory to attain the degree of approximation of representation for which this device is intended.

The various rings 154 to 166 are provided with openings for the projection of the various planets, the sun and the moon. A preferred arrangement of these is with correspondence as follows: Mercury 154, Venus 156, Jupiter 158, Sun 160, Saturn 162, Mars 164 and Moon 166. The planet projecting holes are similar to those used for the projection of the stars and some of these are indicated in Figure 12 at 172, 174 and 176, their rings being faced exteriorly with colored cellophane patches such as indicated at 178, 180 and 182 to color the projected images to correspond with the colors of the planets. In the case of these rings, the light filters thus provided are desirably exterior to avoid their being rubbed off as the rings are adjusted about the rods 148.

A large opening 170 is provided in the ring 160 to give a large projected circle simulating the sun.

A circular opening 184 in the ring 166 provides for the projection of the image of the moon. In this case, in order to illustrate the phases of the moon, there is provided a metal mask 186 which may be secured in various positions by a screw 188 passing through openings therein into a tapped hole adjacent to the opening 184. This mask is provided with various crescent openings 190, 192, 194 and 196. As will be obvious from the drawing, the mask may be turned end for end to show both waxing and waning phases of the moon.

By freeing the nuts 150, the various rings may be set to any relative positions and, in particular, to relative positions with respect to the scale 168 which may correspond to those of a particular date as shown by astronomical tables. After adjustment, the rings may be clamped in fixed position. By the proper adjustment of the lamp 144, any desired approximation for particular bodies to their relationships to the plane of the ecliptic may be obtained. However, since the device is designed for descriptive rather than quantitative demonstration, a considerable latitude of adjustment will affect very little the demonstration. Of course, if it is desired to show a precise relationship between a particular planet and a particular star, the adjustment of the lamp 144 will enable this to be accomplished.

The setting of the planet projector relative to the stellar globe is fixed by the adjustment of the planet projector about the shaft extension 26', the planet projector being, after original adjustment, permanently fixed in position by the set screw 136 unless change is desired to demonstrate the precession of the equinoxes. As will be evident, there are available for setting purposes the projections of the equinoxes and solstices from the stellar globe, the adjustment of the scale 168 about the planet projector and the adjustment of the planet projector about the shaft extension 26' as described. These possible adjustments make demonstrable a great variety of astronomical situations.

Figure 20:
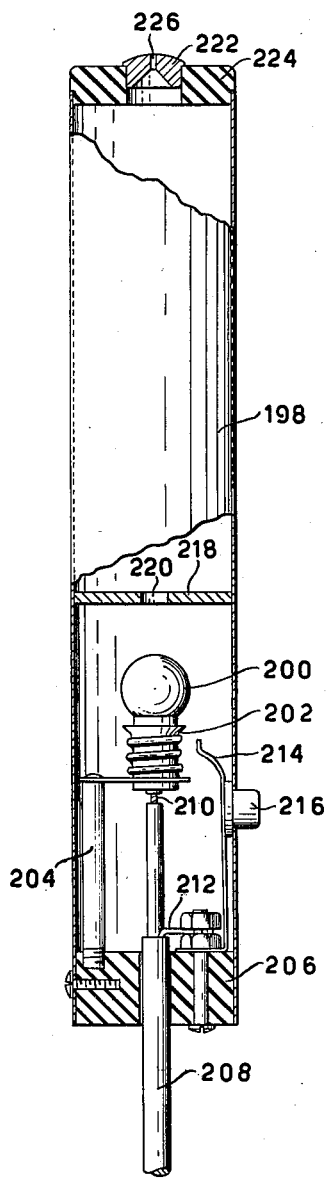
Figure 20 is an elevation, partly in section, showing a pointer which may be used in association with the apparatus by a demonstrator to point to particular portions of the projection.

An auxiliary device of great utility in connection with the planetarium is the pointer illustrated in Figure 20. This comprises a tube 198 containing a lamp 200 in a socket 202 which is supported by a post 204 threaded into an insulated plug 206 fixed in the base of the tube 198. A cable 208 contains a wire 210 connected to the base terminal of the socket and a second wire 212 electrically connected to a spring contact 214 provided with a button 216 extending outwardly through the wall of the tube 198. By pressing the button so as to bring the contact against the side of the socket, the electrical circuit through the lamp is completed. A diaphragm 218 provided with a central opening 220 and a plug 224 supporting a button 222 with a central opening 226 serve to provide the projection of a properly delimited bright spot of light by this device. The demonstrator may use it to point to various parts of the projected system.

The electrical connections are shown diagrammatically in Figure 21, while Figure 1 shows the controls and sockets, etc. on the base. The lamps 40, 144 and 200 are all preferably of the low voltage concentrated filament type referred to above and are consequently desirably operated through step-down transformers 234, 236 and 238 connected to the usual alternating current supply line 228 through a switch 230. A lamp 232 may be connected across the connections to the transformers and is located behind a red lens so as to give indication when the power is on. The motor 98 which may operate directly from the high voltage supply is controlled by a switch 231. It is desirable to have control of the brilliance of the star projecting and planet projecting lamps and for this purpose rheostats 240 and 242 are provided connected to the secondaries of transformers 234 and 236 through switches 239 and 241. The pointer may be connected through the cable 208 and a jack 244 to the secondary of the transformer 238. The physical arrangement of the parts is illustrated in Figure 1 where the various switches and rheostat controls and jacks are designated by the same reference numerals as in Figure 21. An auxiliary jack outlet 246 may be provided connected, for example, to the secondary of transformer 238 for the plugging in of an auxiliary device of any desired character.

It will be evident from the above that there has been provided a simple planetarium having the capability of demonstrating substantially all ordinary astronomical phenomena required for the teaching of astronomy and particularly navigation. It will be evident that numerous changes may be made in details of construction without departing from the invention as defined in the following claims.

What I claim and desire to protect by Letters Patent is:

1. A projector comprising a stack of individually rotatable perforated cylindrical rings, supporting means for said rings, the rings and supporting means forming an enclosure, a concentrated light source mounted substantially centrally of said ring supporting means and substantially on the axis of said enclosure, and means for mounting said enclosure for rotation about said axis.

2. A projector comprising a stack of individually rotatable perforated cylindrical rings, masking means altering the contour of images projected through said perforations, supporting means for said rings, the rings and supporting means forming an enclosure, a light source mounted substantially on the axis of said enclosure, and means for mounting said enclosure for rotation.

3. A projector comprising a stack of individually rotatable perforated cylindrical rings, supporting means for said rings, the rings and supporting means forming an enclosure, a light source mounted substantially on the axis of said enclosure, and means for mounting said enclosure for rotation about an axis forming an angle with the axis of said rings.

4. A projector comprising a stack of individually rotatable perforated cylindrical rings, supporting means for said rings, the rings and supporting means forming an enclosure, a light source mounted substantially on the axis of said enclosure, and means for mounting said enclosure for rotation about an axis forming an angle of approximately 23½° with the axis of said rings.

5. A projector comprising a stack of individually rotatable perforated cylindrical rings, an index ring carrying a scale and associated coaxially with said perforated rings, supporting means for said rings, the rings and supporting means forming an enclosure, a light source mounted substantially on the axis of said enclosure, and means for mounting said enclosure for rotation.

6. In combination, a star projector comprising a hollow perforated globe, and a light source mounted substantially centrally of said globe; a planet projector comprising a stack of individually rotatable perforated cylindrical rings, supporting means for said rings, the rings and supporting means forming an enclosure, and a light source mounted substantially on the axis of said enclosure; and means mounting said globe and said enclosure for simultaneous diurnal movement.

7. In combination, a star projector comprising a hollow globe in the form of a perforated polyhedron, and a light source mounted substantially centrally of said globe; a planet projector comprising a stack of individually rotatable perforated cylindrical rings, supporting means for said rings, the rings and supporting means forming an enclosure, and a light source mounted substantially on the axis of said enclosure; and means mounting said globe and said enclosure for simultaneous diurnal movement.

8. In combination, a star projector comprising a hollow perforated globe, and a light source mounted substantially centrally of said globe; a planet projector comprising a stack of individually rotatable perforated cylindrical rings, supporting means for said rings, the rings and supporting means forming an enclosure, and a light source mounted substantially on the axis of said enclosure; means connecting said globe and said enclosure to maintain the axis of the enclosure at an angle of substantially 23½° relative to the polar axis of the globe; and means mounting said assembled globe and enclosure for diurnal movement.

9. In combination, a star projector comprising a hollow perforated shell, and a light source mounted substantially centrally of said shell; a planet projector comprising a stack of individually rotatable perforated cylindrical rings, supporting means for said rings, the rings and supporting means forming an enclosure, and a light source mounted substantially on the axis of said enclosure; and means mounting said shell and said enclosure for simultaneous diurnal movement.

10. In combination, a star projector comprising a hollow perforated globe, a light source mounted substantially centrally of said globe, and means for limiting substantially to a hemisphere above a horizontal plane through the light source the projection of light from said light source through the perforations in the globe; and a planet projector comprising a stack of individually rotatable perforated cylindrical rings, supporting means for said rings, the rings and supporting means forming an enclosure, and a light source mounted substantially on the axis of said enclosure; and means mounting said globe and said enclosure for simultaneous diurnal movement.

11. In combination, a star projector comprising a hollow perforated polyhedron, and a light source mounted substantially centrally of said polyhedron; and a sun, moon and planet projector comprising a stack of individually rotatable perforated cylindrical rings, an index ring carrying a scale and associated coaxially with said perforated rings, supporting means for said rings, the rings and supporting means forming an enclosure, and a light source mounted substantially on the axis of said enclosure; and means mounting said polyhedron and said enclosure for diurnal rotation, said means including a driving element, a motor for driving said element, a driven element, and yieldable clutch means between the driving and driven elements, said driven element being manually operable independently of said driving element.

12. In combination, a star projector comprising a hollow perforated globe, and a light source mounted substantially centrally of said globe; a planet projector comprising a stack of individually rotatable perforated cylindrical rings, supporting means for said rings, the rings and supporting means forming an enclosure, and a light source mounted substantially on the axis of said enclosure; and means mounting said globe and said enclosue for simultaneous diurnal movement, said means including a driving element, a motor for driving said element, a driven element, and yieldable clutch means between the driving and driven elements, said driven element being manually operable independently of said driving element.

ARMAND N. SPITZ.

REFERENCES CITED

The following references are of record in the file of this patent:

UNITED STATES PATENTS

| Number | Name | Date |
| --- | --- | --- |
| 575,735 | Reese | Jan. 26, 1897 |
| 1,814,984 | Vanderhider | July 14, 1931 |
| 1,857,546 | Hirschl | May 10, 1932 |
| 1,959,601 | Schulse | May 22, 1934 |
| 2,153,053 | Smith | Apr. 4, 1939 |
| 2,178,352 | Unglaube et al. | Oct. 31, 1939 |
| 2,424,601 | Crouch | July 29, 1947 |
| 2,477,027 | Wenberg | July 26, 1949 |